United States Patent
Otsuka et al.

(10) Patent No.: US 7,295,682 B2
(45) Date of Patent: Nov. 13, 2007

(54) LANE RECOGNITION SYSTEM

(75) Inventors: Yuji Otsuka, Hitachi (JP); Shoji Muramatsu, Hitachi (JP); Hiroshi Takenaga, Tokai-mura (JP); Jiro Takezaki, Hitachinaka (JP); Tatsuhiko Monjii, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 638 days.

(21) Appl. No.: 10/271,944

(22) Filed: Oct. 17, 2002

(65) Prior Publication Data

US 2003/0072471 A1    Apr. 17, 2003

(30) Foreign Application Priority Data

Oct. 17, 2001   (JP)   ............................. 2001-319172

(51) Int. Cl.
    *G06K 9/00*   (2006.01)
(52) U.S. Cl. ................... 382/103; 382/104; 404/12
(58) Field of Classification Search ............... 382/104, 382/103; 340/901, 902, 903, 932, 935, 988, 340/991; 701/1, 12, 19, 20, 21, 22, 23, 29, 701/32, 36, 45, 49, 50, 53, 69, 72, 74, 82, 701/89, 91, 93, 96, 117; 404/12, 58, 112
See application file for complete search history.

(56) References Cited

U.S. PATENT DOCUMENTS

| | | | |
|---|---|---|---|
| 4,970,653 A * | 11/1990 | Kenue | 701/28 |
| 5,835,028 A | 11/1998 | Bender et al. | 340/937 |
| 5,987,374 A * | 11/1999 | Akutsu et al. | 701/117 |
| 6,005,492 A * | 12/1999 | Tamura et al. | 340/937 |
| 6,133,824 A | 10/2000 | Lee et al. | 340/435 |
| 6,321,159 B1 * | 11/2001 | Nohtomi et al. | 701/207 |
| 6,343,247 B2 * | 1/2002 | Jitsukata et al. | 701/28 |
| 6,487,501 B1 * | 11/2002 | Jeon | 701/301 |
| 6,526,352 B1 * | 2/2003 | Johnson et al. | 701/213 |
| 6,819,779 B1 * | 11/2004 | Nichani | 382/104 |

FOREIGN PATENT DOCUMENTS

| | | |
|---|---|---|
| EP | 0586857 A1 | 3/1994 |
| JP | 6-341821 | 12/1994 |
| JP | 7-128059 | 5/1995 |
| JP | 7-141599 | 6/1995 |
| JP | 11-196799 | 10/1999 |

OTHER PUBLICATIONS

European Search Report mailed Feb. 7, 2003.

* cited by examiner

*Primary Examiner*—Samir Ahmed
*Assistant Examiner*—Abolfazl Tabatabai
(74) *Attorney, Agent, or Firm*—Crowell & Moring LLP

(57) ABSTRACT

A driving lane recognition system which can improve the lane recognition accuracy by stably detecting the various kinds of lane markers is disclosed. An image processing means 6 for image-processing a road image taken by a camera 5 has a plurality of different kinds of image processing algorithms 9 to 11. A driving lane is detected by selecting an image processing algorithm suitable for the driving lane out of the plurality of different kinds of image processing algorithms 9 to 11 corresponding to a road on which a vehicle is running.

9 Claims, 12 Drawing Sheets

LANE RECOGNITION SYSTEM

BACKGROUND OF THE INVENTION

The present invention relates to a driving lane recognition system for recognizing a driving lane of a vehicle by executing image processing of a road-surface image taken by a camera, and particularly to a driving lane recognition system for driving in a lane appropriately corresponding with a plurality of lane marker shapes (kinds).

A technology of recognition of vehicle driving lane is a technology necessary for a lane departure warning system of a vehicle, a lane keeping support system for executing steering assist control and so on. In regard to the driving lane recognition technology, there are a method that lane markers formed of magnet are embedded in a load to recognize a driving lane from the magnetic field positions; a method that a position of a vehicle is measured with high accuracy using a differential GPS or a kinematic GPS to calculate a driving lane from highly accurate road map data; and so on. However, any of these methods requires construction of the infrastructure, and accordingly the applicable area is limited.

On the other hand, a method of using image processing by detecting a driving lane from a camera image has an advantage in that the applicable area is wide because there is no need to construct the infrastructure.

In the lane recognition using the image processing, stable recognition is always required in taking various statuses of road surface into consideration. In Japanese Patent Application Laid-Open No.7-128059 disclosing a method in which a parameter or a threshold is changed corresponding to a road surface status, it is described that the threshold used for extracting an edge of a white line of lane maker is determined from the edge intensity. Further, in Japanese Patent Application Laid-Open No. 6-341821, it is described that recognition area is changed by independently setting thresholds from the edge intensities of right and left white lines. As described above, by changing a threshold or a parameter corresponding to a road surface status, stable recognition results can be obtained for various road surface statuses.

Although the conventional technologies cope with the various statuses of road surface by changing the threshold or the parameter, the recognition is made using the image processing algorithm which is created on the premise that the lane markers are white lines.

Most of the lane markers are white lines (yellow lines) in Japan, but raised pavement markers and post cones in addition to the white lines are used as the lane markers in various foreign countries. The detection of driving lane is performed in order to obtain a displacement of a vehicle and a curvature of the lane. When various kinds of the lane markers such as the white line, the raised pavement marker, the post cone and so on are image-processed using a common image processing algorithm, there is a problem in that the recognition accuracy of the resultant recognition rate is degraded.

SUMMARY OF THE INVENTION

The present invention is made to solve the above-mentioned problem, and an object of the present invention is to provide a driving lane recognition system which can improve the lane recognition accuracy by stably detecting the various kinds of lane markers.

A driving lane recognition system in accordance with the present invention is characterized by that an image processing means for image-processing a road image comprises a plurality of different kinds of image processing algorithms, and a driving lane is detected by selecting one of the image processing algorithms suitable for the driving lane out of the plurality of image processing algorithms corresponding to a road on which the vehicle is running.

In more detail, the image processing algorithm is selected by identifying a kind of lane marker on the road on which the vehicle is running, or an image processing algorithm employed for detecting the driving lane of the vehicle in this time is selected based on a recognition confidence by an image processing algorithm employed for detecting the driving lane of the vehicle in the precedent time.

The driving lane recognition system in accordance with the present invention comprises the plurality of different kinds of image processing algorithms in the image processing means for image-processing a road image, and a driving lane is detected by selecting one of the image processing algorithms suitable for the driving lane out of the plurality of image processing algorithms corresponding to a road on which the vehicle is running. Therefore, the present invention can improve the recognition accuracy of lane by stably detecting one of the plural kinds of lane markers.

DETAILED DESCRIPTION OF THE PREFERRED EMBODIMENTS

Figure 1:
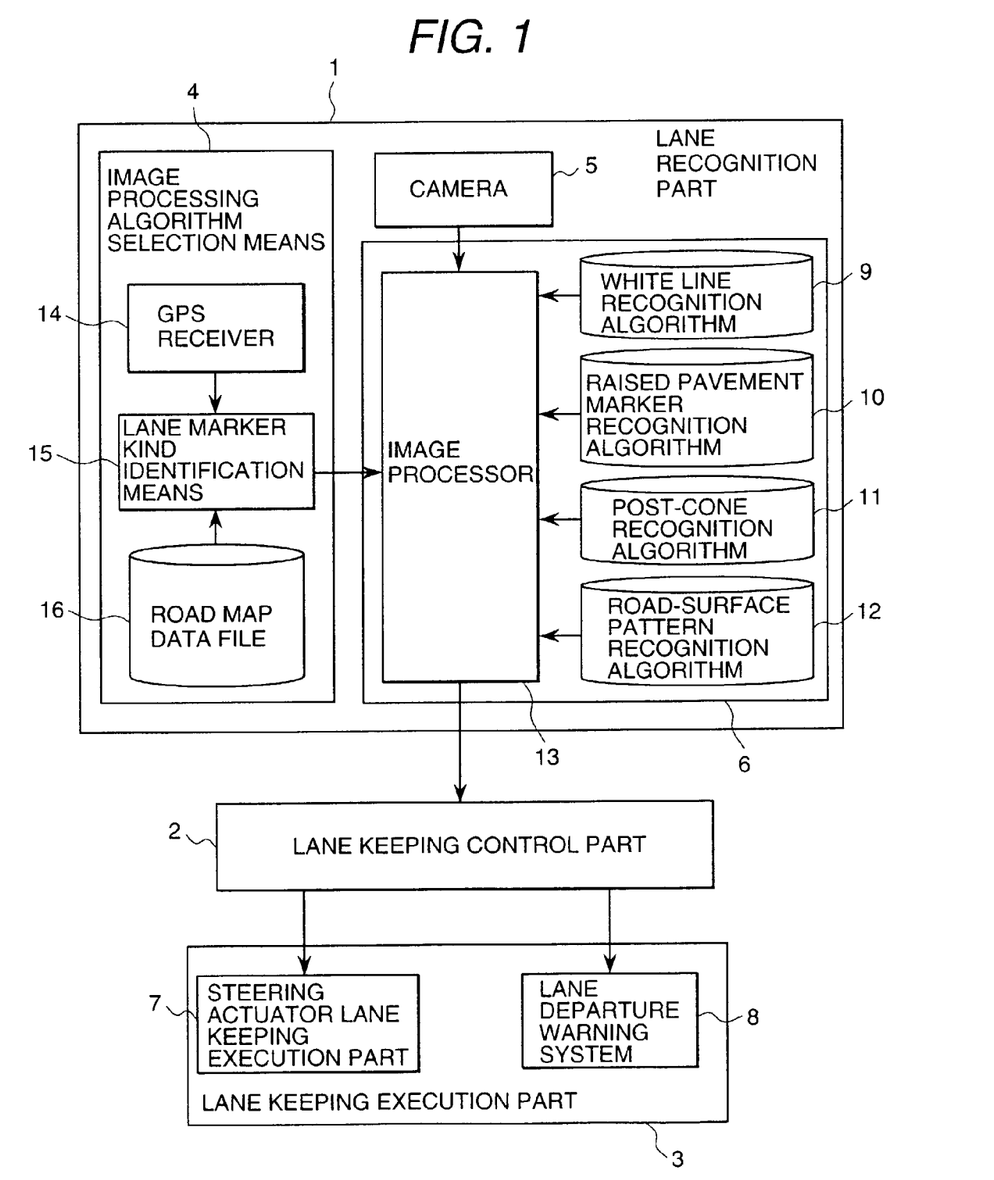
FIG. 1 is a block diagram showing the structure of an embodiment in accordance with the present invention.

An embodiment in accordance with the present invention is shown in FIG. 1. FIG. 1 is a block diagram of a lane keeping system.

The driving lane recognition system in accordance with the present invention composes the lane keeping system. The overall construction of the lane keeping system will be initially described below, and then each of the embodiments will be described in detail.

Referring to FIG. 1, the lane keeping system is composed of a lane recognition part 1 for obtaining lane position information necessary for lane keeping control, a lane keeping control part 2 for controlling a vehicle and a lane keeping execution part 3 relating to operation of lane keeping.

The lane recognition part 1 is composed of a camera 5 as an imaging means for taking an image of a road in front of the vehicle, an image processing means 6 having image processing algorithms individually corresponding to shapes (kinds) of lane markers, and an image processing algorithm selection means 4 for selecting an image processing algorithm to be executed out of the plurality of image processing algorithms stored in the image processing means 6.

The image of the road in front of the vehicle obtained from the camera 5 is processed by the image processing means 6 to obtain a lane recognition result. The lane recognition result contains displacement information of the vehicle to the lane and curvature information of the lane. The displacement information is expressed by 0 when the vehicle is running in the center of the lane, a negative value when the vehicle is running by displacing toward left hand side, a positive value when the vehicle is running by displacing toward right hand side, and the value is larger as the displacement is larger.

The lane recognition result of the image processing means 6 is processed by the lane keeping control part 2 to execute control of the lane keeping execution part 3. In concrete, the lane keeping execution part 3 assists the steering so that the vehicle is driven along the lane by controlling a steering actuator 7 or makes a warning to the driver by starting a lane departure warning system 8 when the vehicle is about to depart from the lane.

The driving lane recognition system (the driving lane recognition part) 1 comprises the image processing means 6 having the plurality of image processing algorithms 9 to 12, and the image algorithm selection means 4 for selecting one of the image processing algorithm corresponding to a kind of lain marker from the plurality of image processing algorithms.

The image processing algorithms 9 to 12 stored in the image processing means 6 will be described below.

The image processing means 6 comprises four kinds of the image processing algorithms. That is, in regard to the image processing algorithms corresponding to the shapes of lain markers, there are provided a white line recognition algorithm 9 for detecting position of a white line (including a yellow line), a raised pavement marker recognition algorithm 10 for detecting a position of a raised pavement marker, a post cone recognition algorithm 11 for detecting a position of a post cone, and a road surface pattern recognition algorithm 12 for detection a road surface pattern (for example, wheel track and so on) in a case of an old paved road difficult to visually observe the lane makers due to blur or soil, an un-paved road incapable of detecting the lane markers or a road in a bad status such as at snow accumulation.

In the case of the algorithm for detecting the lane markers, if a position of the lane marker is detected, the displacement of the vehicle to the lane can be calculated. Further, if several positions of lane markers arranged with certain meter (for example, 10 m) spacing in front of the vehicle is obtained, a curvature of the lane can be calculated. On the other hand, in the case of the road surface pattern recognition algorithm 12, positions of the lane markers can not be known. However, by detecting a side end position of the road or a position of the preceding vehicle, a displacement of the vehicle to the lane is calculated. The curvature of the lane can be calculated by analyzing a road surface pattern in front of the vehicle.

Each of the image processing algorithms 9 to 12 executes the following processing.

Figure 3:
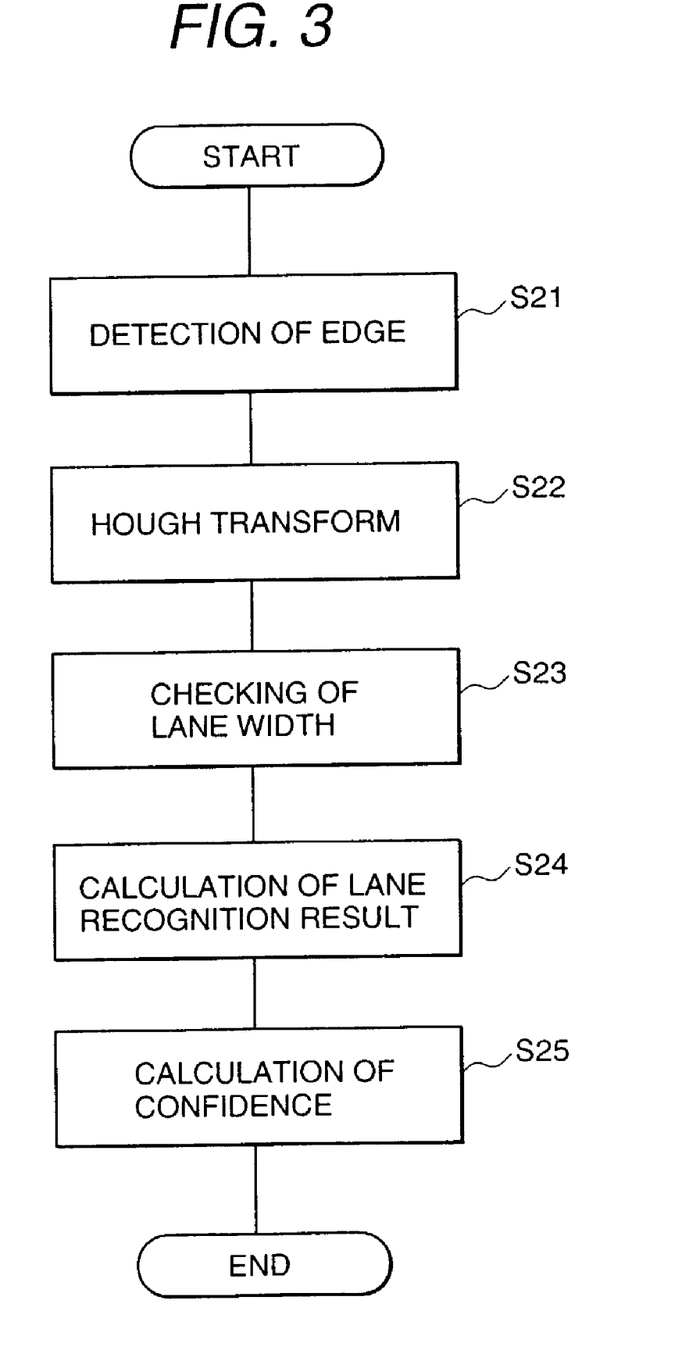
FIG. 3 is a processing flowchart of a white line recognition algorithm.

The white line recognition algorithm 9 detects positions of white lines 41 painted (arranged) on the road surface as shown in FIG. 11(*a*). The processing flow of the white line recognition algorithm 9 is as shown in FIG. 3. Because a density value of the portion of the white line 41 is higher than a density value of the road surface, the position of the white line is detected using this characteristic.

In Step S21, edge detection is initially performed to detect the boundary portion between the white line 41 and the road surface. In Step S22, Hough transform is performed at the detected points to detect a straight line component composed of the edge points. In a case where the driving road is curved, the white line 41 becomes a curved line. However, by performing the Hough transform by dividing the edge points into the portion near the own vehicle and the portion distant from the own vehicle, the curved line can be approximated by straight lines.

After detecting candidates of the straight line component for the white line 41, checking of the lane width is executed in Step S23 by judging whether or not the detected straight line is the white line 41. The lane width is generally around 3.5 m, and an actual white line 41 can be selected out of the candidates for the white line based on this information. The lane width checking can be used not only for the white line recognition algorithm 9, but also for the raised pavement marker recognition algorithm 10 and the post cone recognition algorithm 11.

After detecting the position of the white line 41 on an image, the lane recognition results of information on displacement of the vehicle to the lane and information on the lane curvature are calculated in Step S24. The processing proceeds from Step S24 to Step S25 to calculate a confidence of the lane recognition of the white line 41. The method of calculating the lane recognition confidence is to be described later.

Although in the present embodiment the edge points appearing on the boundary line between the white line 41 and the road surface are used, detection of the white line can be performed by extracting a portion of a higher density value because the white line portion has a high density value. Therefore, the detection accuracy can be further improved by combining this extracting method and the edge point method.

Figure 4:
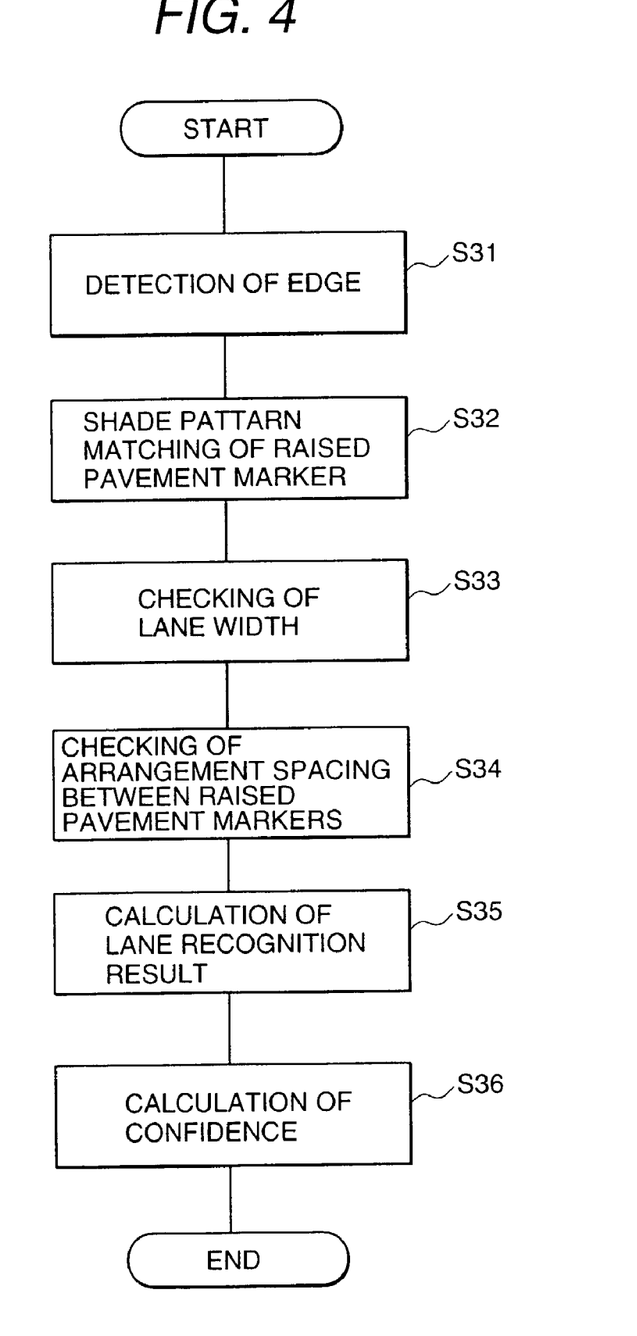
FIG. 4 is a processing flowchart of a raised pavement marker recognition algorithm.

The raised pavement marker recognition algorithm 10 is an algorithm for detecting positions of raised pavement markers 42 embedded in the road surface as shown in FIG. 11(*b*). The processing flow of the raised pavement marker recognition algorithm 10 is as shown in FIG. 4.

In the most cases of the raised pavement marker 42, the density difference between the raised pavement marker and the road surface is smaller compared to the case of the white line. Initially, the edge detection is performed in Step S31, and in Step S32 the processing of pattern matching of the raised pavement marker is performed near a position where the edge is detected.

The edge detection in Step S31 is used for limiting a search area of the pattern matching. The patter matching in Step S32 performed by pre-registering patterns of the raised pavement markers 42 as templates, and detecting the position of the pattern through template matching.

After that, in Step S33, the lane width checking similar to in the case of the white line 41 is executed to exclude candidates of the raised pavement markers not matching the condition. Further, because the raised pavement markers are arranged with an equal spacing, checking of arrangement spacing between raised pavement markers is executed in Step S34 to further identify the candidates of the raised pavement markers. The calculation of the lane recognition result executed in Step S35 is the same as in the case of the white line 41, and the processing proceeds from Step S35 to Step S36 to calculate a confidence of the lane recognition. The method of calculating the lane recognition confidence in Step S36 is to be described later.

Figure 5:
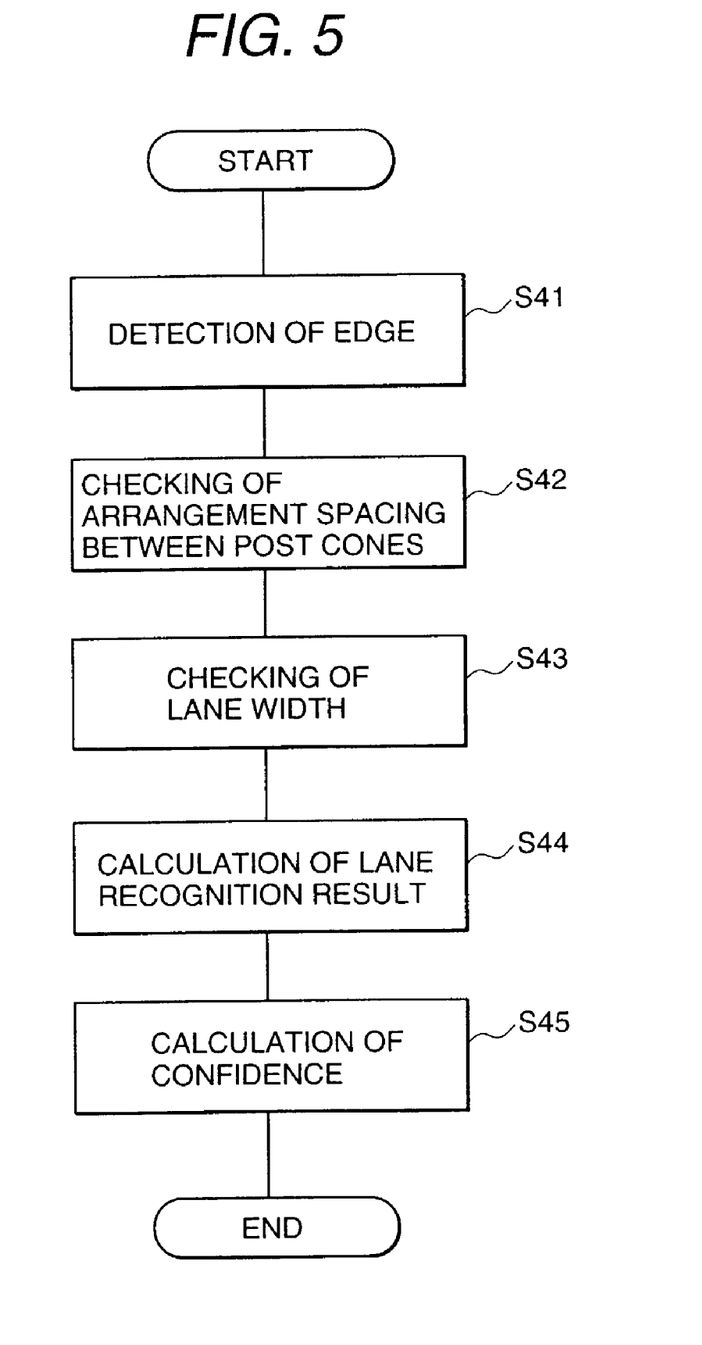
FIG. 5 is a processing flowchart of a post cone recognition algorithm.
Figure 11A:
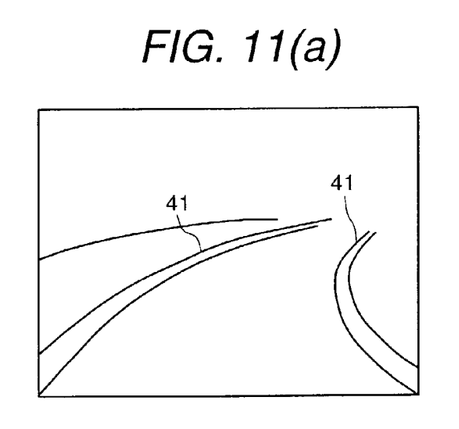
FIG. 11 is explanatory illustrations expressing various shapes of lane markers.
Figure 11B:
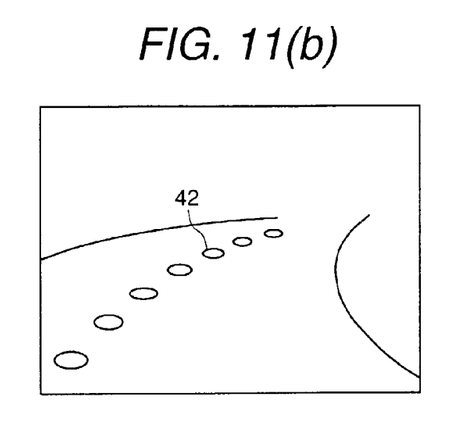
Figure 11C:
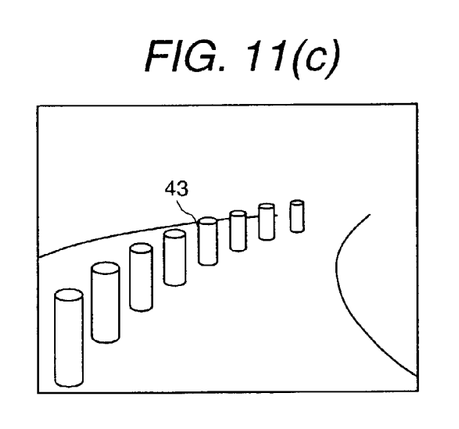

The post cone recognition algorithm 11 is an algorithm for detecting positions of post cone 43 arranged on the road surface so as to preventing departure from the lane as shown in FIG. 11(c). The processing flow of the post cone recognition algorithm 11 is as shown in FIG. 5.

Since the post cone 43 is a cylindrical pole colored in red or green, a vertical edge is detected similarly to the case of the white line recognition algorithm 9 in Step S41. Further, since the post cones 34 are arranged with spacing similarly to the raised pavement markers 42, checking of arrangement spacing between the post cones is executed in Step S42 to further identify the candidates of the post cone.

After that, in Step S43, the lane width checking similar to in the cases of the white line 41 and the raised pavement marker 42 is executed to exclude candidates of the post cone not matching the condition. However, since the post cone 43 is tall, the lane width check is performed in the distance between the roots of the post cones 43. The calculation of the lane recognition result executed in Step S44 is the same as in the case of the white line 41, and the method of calculating the lane recognition confidence in Step S45 is to be described later.

Figure 6:
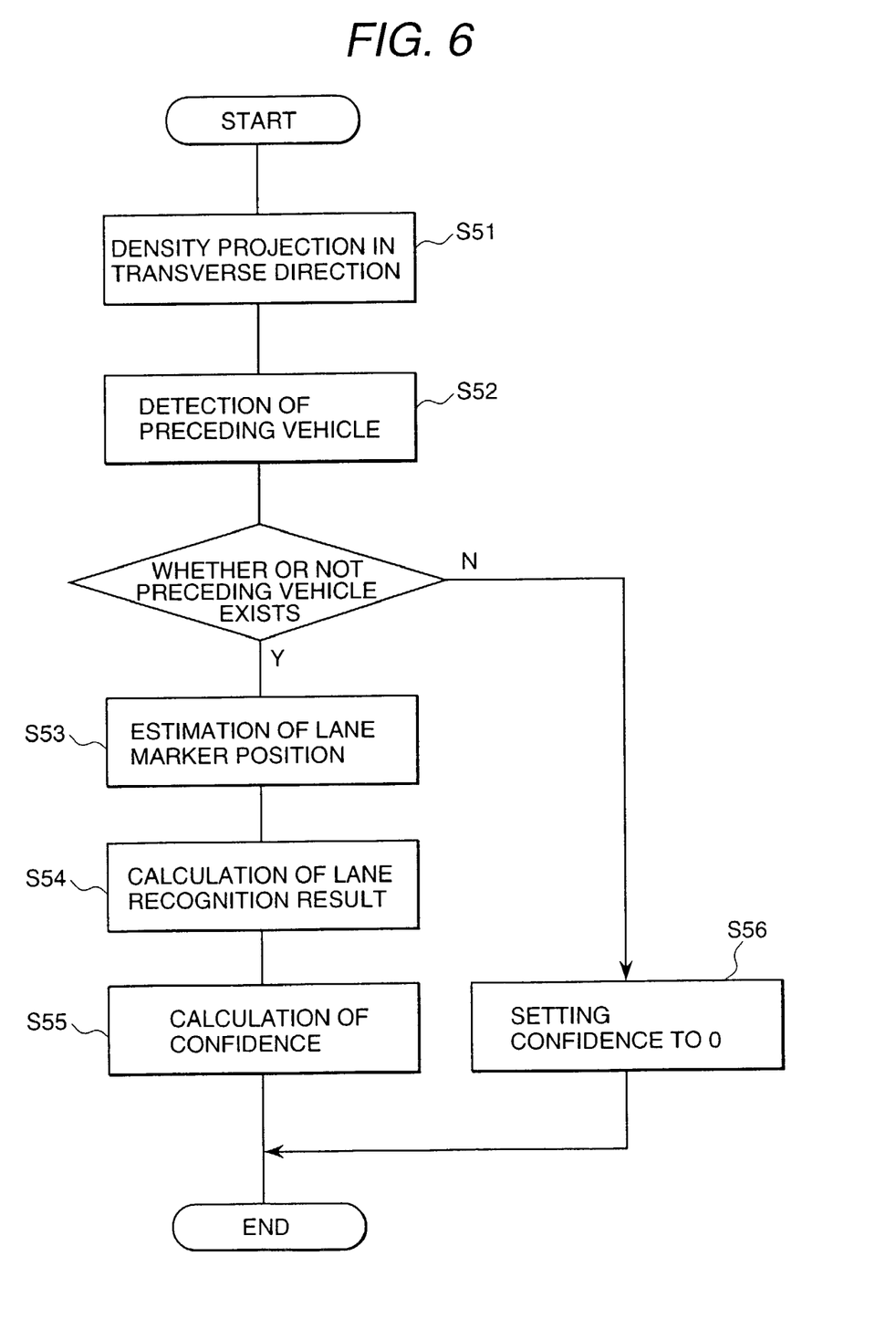
FIG. 6 is a processing flowchart of a road surface pattern recognition algorithm.
Figure 11D:
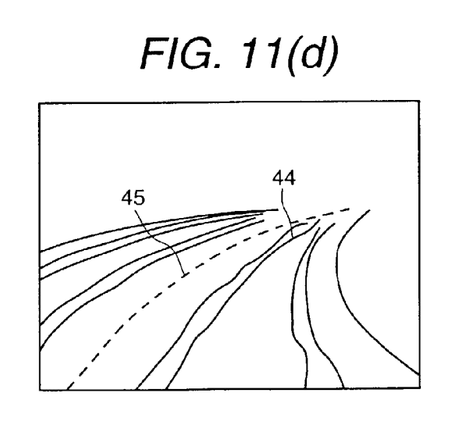

The road surface pattern recognition algorithm 12 is an algorithm for performing detection of the lane by analyzing a pattern on the road surface when recognition of the lane is difficult because the lane markers 44 is about to disappear as shown in FIG. 11(d). The processing flow of the road surface pattern recognition algorithm 12 is as shown in FIG. 6.

The road surface pattern recognition algorithm 12 premises that a density pattern on the road surface in the transverse direction made by an exhaust gas trace or a wheel track attached on an old paved road surface similarly appears frontward without change.

Figure 12A:
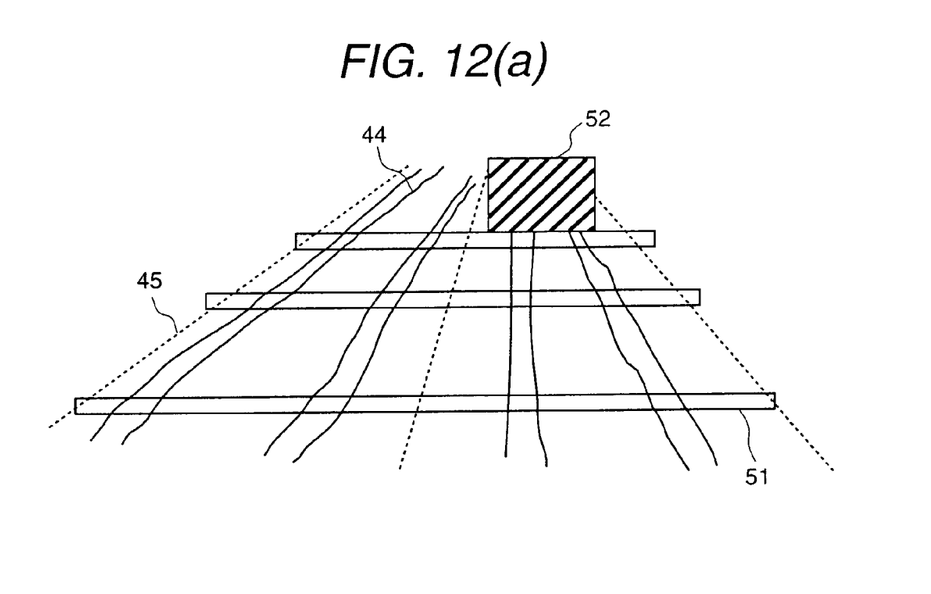
FIG. 12 is illustrations explaining density projection used in the road surface pattern recognition algorithm.
Figure 12B:
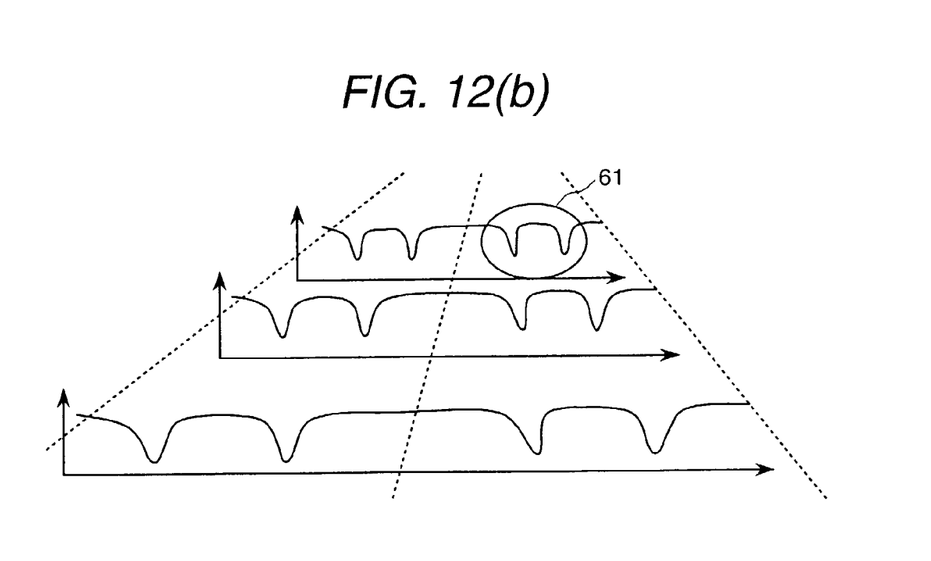

In Step S51, transverse direction density processing is executed to stripe zones 51 on the road surface shown in FIG. 12 in order to detect density patterns on the road surface in the transverse direction. FIG. 12(b) shows the transverse density projections, and the ordinate indicates the density cumulative value and the abscissa indicates the abscissa of FIG. 12(a). By setting the pattern of FIG. 12(b) to a reference road surface density pattern, pattern matching between the reference road surface density pattern and a road surface density pattern of the next frame image is executed only in the transverse direction.

The road surface density pattern of the next frame image agrees with the reference road surface density pattern at a nearly equal position when the vehicle is running on a single lane. However, the road surface density pattern of the next frame image agrees with the reference road surface density pattern at a position in the right hand side when the vehicle is shifted the left hand side to the lane, and the road surface density pattern of the next frame image agrees with the reference road surface density pattern at a position in the left hand side when the vehicle is shifted the right hand side to the lane.

The road surface pattern algorithm 12 can detect only a relative displacement from the preceding frame (the lane recognition in the preceding time) because it can not detect the lane markers (the boundary line of the lane). In order to measure the absolute displacement with respect to the lane, it is necessary to judge which part in the density pattern is the lane marker.

Therefore, a driving position of a preceding vehicle 52 is referred on the premise that the preceding vehicle 52 is running along the center line of the lane. In order to do so, initially the preceding vehicle is detected in Step S52. The detection of the preceding vehicle 52 is executed by extracting a rectangular area having many edges in the transverse direction because the preceding vehicle 52 has many lines in the transverse direction.

After detecting the preceding vehicle 52, the processing proceeds to Step S53 to execute lane marker position estimation processing. That is, as shown in FIG. 12, a road surface pattern 61 in the lateral direction in a portion where the preceding vehicle 52 is running, and then estimation of lane marker positions in the position of the preceding vehicle 52 is executed. Estimation of lane marker positions near the own vehicle is executed by searching a portion matching with the road surface density pattern.

There, the preceding vehicle 52 is observed small because it exists in the distance from the own vehicle. That is, since the road surface density pattern at the position of the preceding vehicle is shorter in the cycle than that of the road surface density pattern near the own vehicle on the image frame due to the distant length, the matching is executed by fitting the cycle. By executing the road surface density pattern matching with the position of the referred preceding vehicle as described above, the displacement from the lane can be calculated.

In a case where no preceding vehicle is exists, the recognition is set to incapability by setting the lane recognition confidence to 0 in Step S56 because it can not judged which part in the lateral direction road surface density pattern is the lane marker.

Each of all the above-described algorithms (the white line recognition algorithm 9, the raised pavement marker recognition algorithm 10, the post cone recognition algorithm 11 and the road surface pattern recognition algorithm 12) outputs the lane recognition confidence as the lane recognition result.

The lane recognition confidence means an index expressing the reliability of the lane recognition result. When the value is small, the possibility of detecting a correct position of the lane is low because of difficulty of visually observing the lane markers. Since the method of setting the lane recognition confidence is different according to the used algorithm, it may be arbitrarily set. However, the lane recognition confidence is an index for judging whether or not the lane markers can be recognized, the value is normalized so as to vary in the range between 0 and 1. The reliability of the lane recognition result is higher as the confidence is close to 1, and is lower as the confidence is closer to 0.

The recognition confidence of the edge point detection executed in the white line recognition algorithm 9 and the post cone recognition algorithm 11 is defined as "recognition confidence=number of edge points of the lane marker/ number of the total edge points of the road surface".

The recognition confidence of the pattern matching in the raised pavement marker recognition algorithm 10 and the road surface pattern recognition algorithm 12 is defined as "recognition confidence=matching correlation value".

As described above, even if the shape of the lane marker is different, the driving lane can be recognized by preparing and using a plurality of image processing algorithms.

Figure 7:
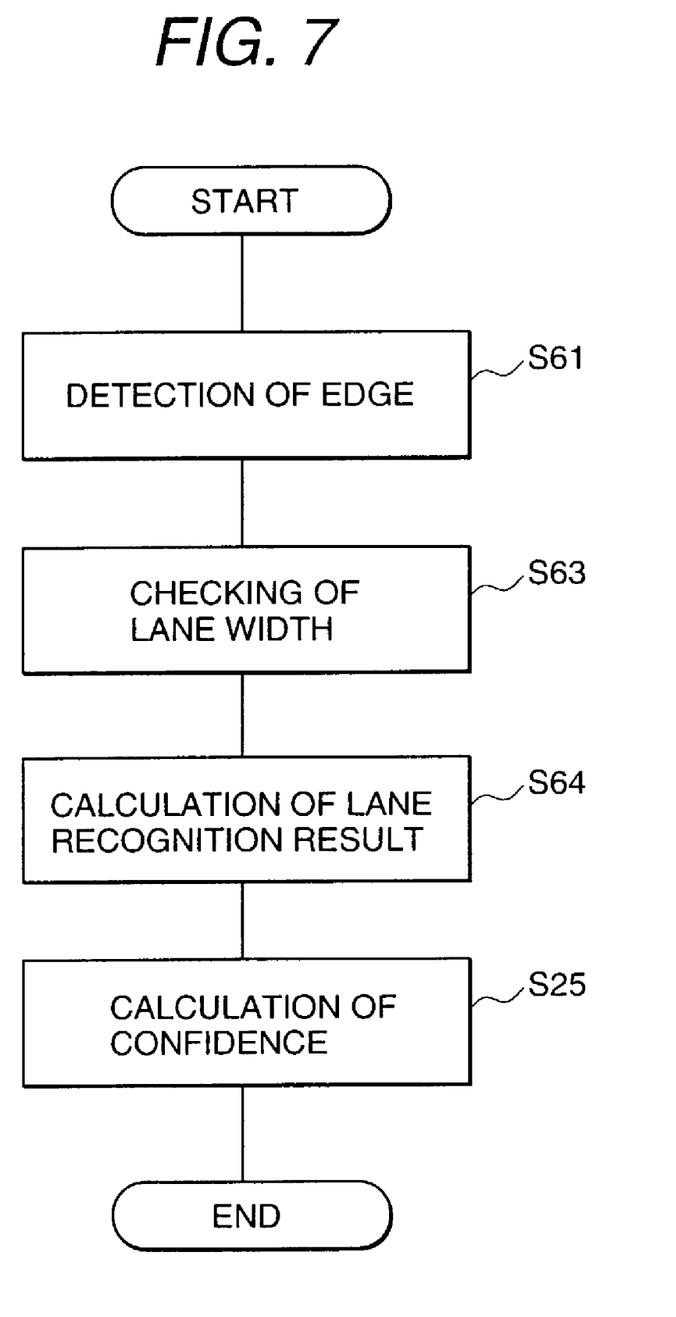
FIG. 7 is a processing flowchart of an example of a common line marker recognition algorithm.

For the purpose of understanding the present invention, an example of a flow of the image processing algorithm for commonly recognizing the white line, the post cone and the raised pavement marker is shown in FIG. 7. That is, the processing is Step S61 to Step S64.

The image processing algorithm selection means 4 will be described below, returning to FIG. 1.

An absolute position of the own vehicle is identified by the GPS receiver 14 using an electromagnetic wave from a satellite, not shown, and a driving road of the own vehicle is recognized from the road map data file 16. Information on the lane marker shapes (the white line, the raised pavement marker and the post cone) for each road is added to the road map data file 16.

The lane marker kind identification means 15 identifies a kind of the lane marker shape from the driving road of the own vehicle and outputs the kind of the lane marker shape to the image processor 13. When the lane marker information (image processing algorithm selection information) of the driving road is input, the image processor 13 selects one of the image processing algorithms.

In order to select the image processing algorithm, the kind of the image processing algorithm may be added to the road map data 16. Hereinafter, the selection of the image processing algorithm as described above is referred to as a road map referring method.

Figure 2:
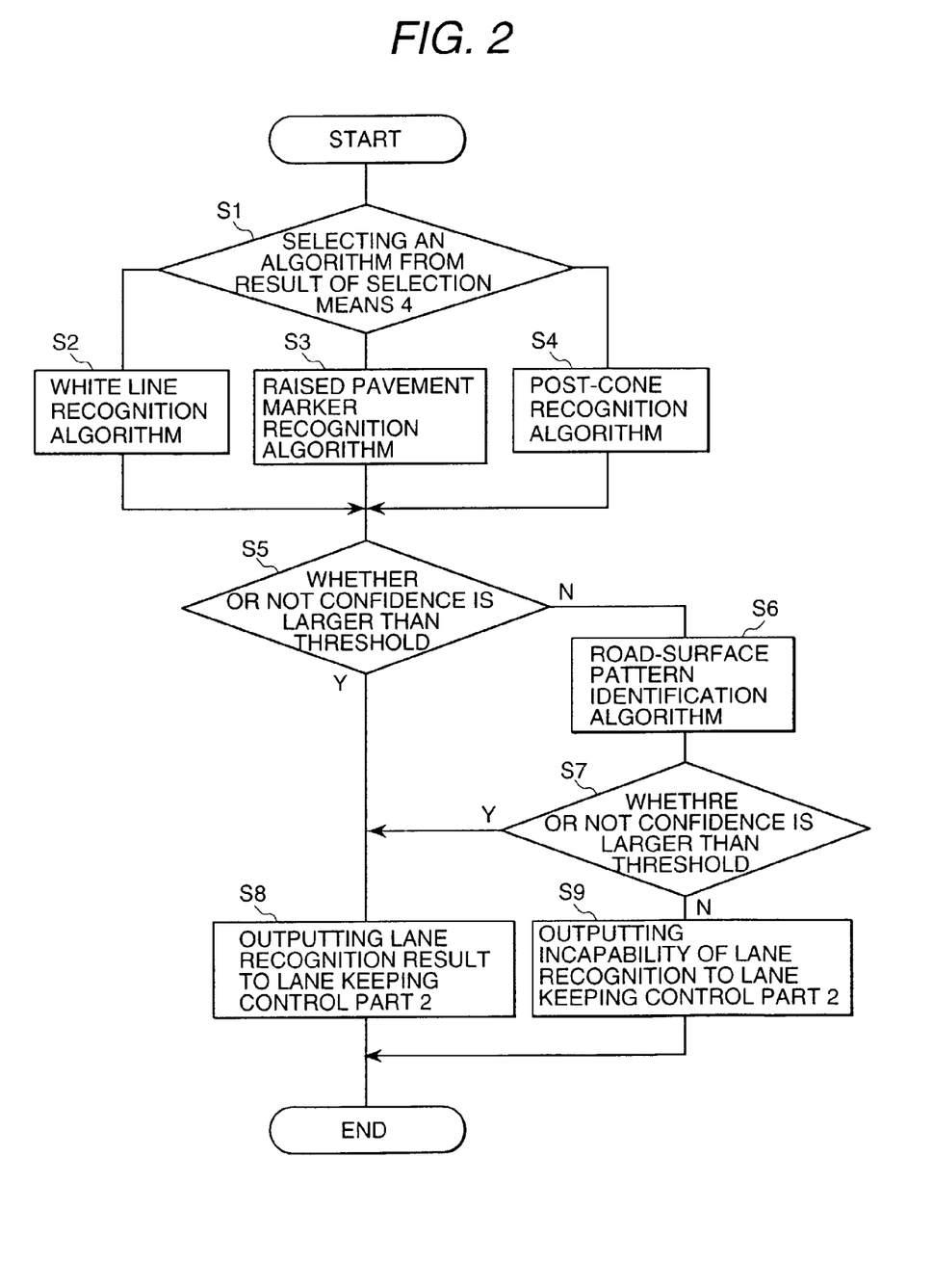
FIG. 2 is a processing flowchart explaining the operation of the present invention.

FIG. 2 shows the processing flow of the image processing means 6 in the road map referring method.

Initially, in Step S1, any one of the white line recognition algorithm (Step S2), the raised pavement marker recognition algorithm (Step S3) and the post cone recognition algorithm (Step S4) is selected according to the lane marker kind obtained from the image processing algorithm selection means 4.

The processing of Step S2 is executed when the white line recognition algorithm 9 is selected in Step S1. The driving lane is detected using the edge information of the white line 41 or the high density value of the white line portion. The output is the lane recognition result and the lane recognition confidence.

The processing of Step S3 is executed when the raised pavement marker recognition algorithm 10 is selected in Step S1. The pattern of the raised pavement marker 42 is pre-registered as a template, and positions of the pattern are detected. Step S3 is executed when the raised pavement marker recognition algorithm 10 is selected in Step S1.

The processing of Step S4 is executed when the post cone recognition algorithm 11 is selected in Step S1. The driving lane is detected by using edge information in the vertical direction and/or color information or using a solid body visual technology because the post cone has a height. In the case of the raised pavement marker emitting light during night, the raised pavement marker of this kind can be detected by using density information. Step S3 is executed when the raised pavement marker recognition algorithm 10 is selected in Step S1.

In Step S5, it is judged from the lane recognition confidence obtained in Step S2, Step S3 or Step S4 whether or not the driving lane can have been detected. If the lane recognition confidence exceeds a preset threshold, the processing proceeds to Step S8 by considering that the lane is detected. If the lane recognition confidence does not exceed the preset threshold, the processing proceeds to Step S6 by considering that the lane is not detected. Here, the threshold means a judgment index for judging that the lane is recognized when the lane recognition confidence exceeds the value. The value is initially set to around 0.5, and then is adjusted by being increased or decreased depending on the operation of the detection.

The processing of Step 6 is executed when the lane can not be detected by one of the image processing algorithms 9 to 11 selected in Step S1. In such a case, since the lane markers may be difficult to be visually detected due to an effect of deterioration or stain of exhaust gas or snow fall, the processing of detecting the lane is executed again by the road surface pattern recognition algorithm 12 which can recognize the driving lane using information other than the lane markers. The output of the processing result in Step S6 is the lane recognition result and the lane recognition confidence.

In Step S7, from the lane recognition confidence obtained by Step S6 it is judged whether or not the driving lane can be detected. If the lane recognition confidence exceeds a preset threshold, the processing proceeds to Step S8 by considering that the lane is detected. If the lane recognition confidence does not exceed the preset threshold, the processing proceeds to Step S9 by considering that the lane is not detected.

The processing of Step S8 is executed when it is judged that the lane is detected. The lane recognition result is output to the lane keeping control part 2. The processing of Step S9 is executed when it is judged that the lane is not detected. Information of incapability of lane detection is output to the lane keeping control part 2.

According to the road map referring method, one of the optimal image processing algorisms can be always selected if the lane marker shape or the optimal image processing algorithm is stored in the road map data. Therefore, useless trial can be reduced, and a highly reliable lane recognition system can be provided.

Figure 8:
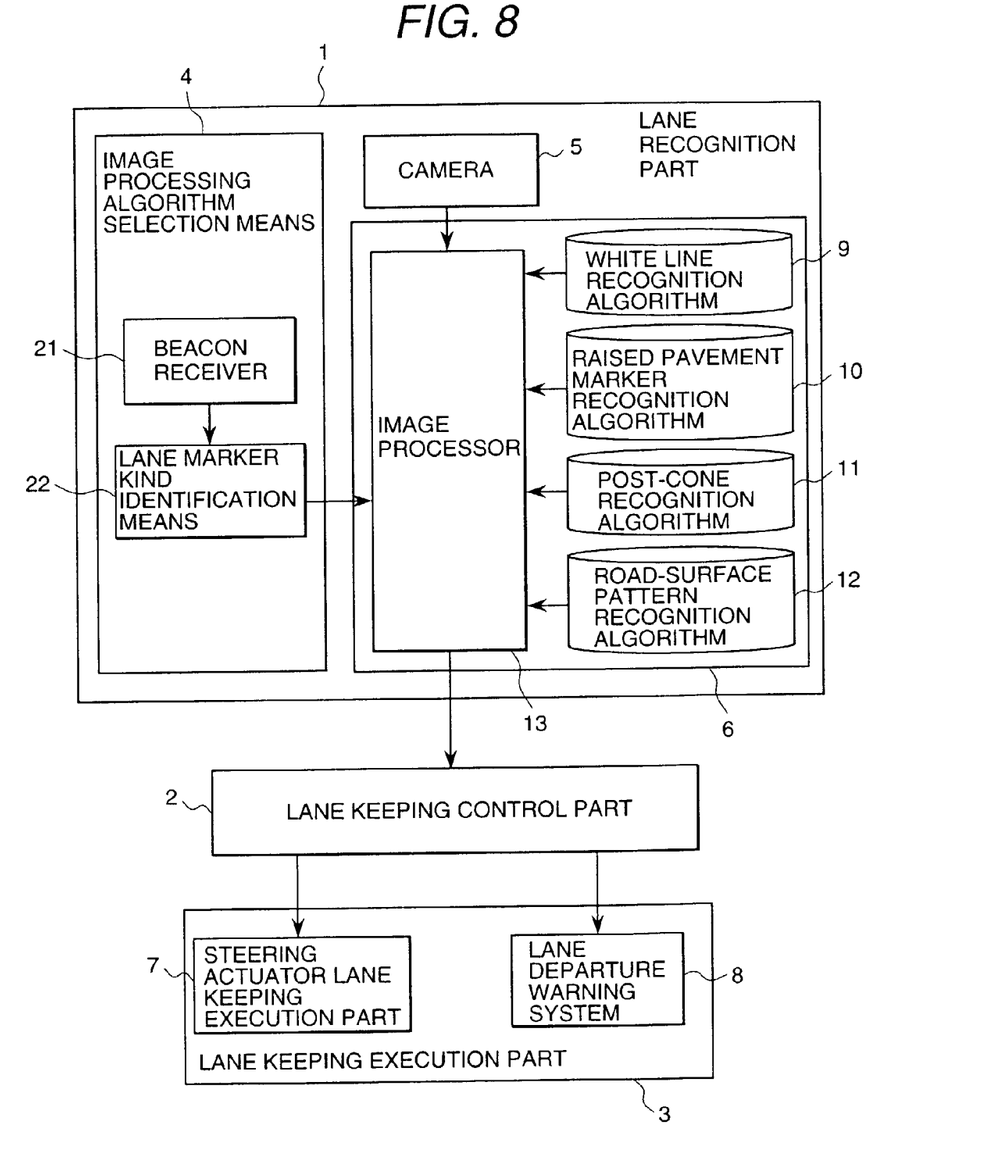
FIG. 8 is a block diagram showing the structure of another embodiment in accordance with the present invention.

Further, although in the embodiment of FIG. 1, it is described on an example of using the GPS and the road map data for knowing the lane marker shape on the road surface, the lane marker shape can be known using a road-to-vehicle communication using a beacon, as shown in FIG. 8. That is, the same function can be attained by the method that a beacon receiver 21 is mounted on the vehicle, and the lane marker information is directly received from the beacon installed in the road.

Figure 9:
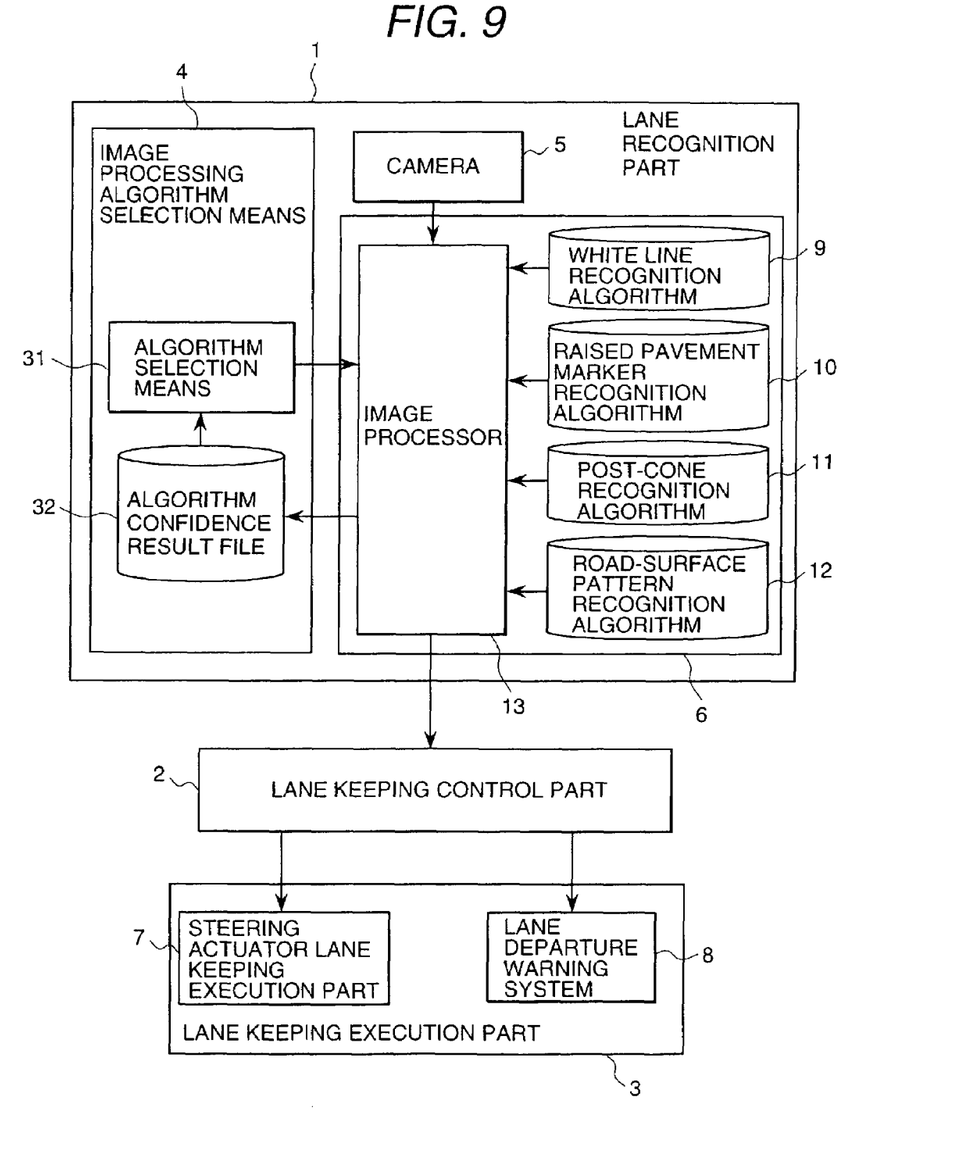
FIG. 9 is a block diagram showing the structure of another embodiment in accordance with the present invention.

FIG. 9 shows another embodiment in accordance with the present invention.

The embodiment of FIG. 9 is constructed so that the image processing algorithm is selected without using the road map referring method.

In FIG. 9, the part corresponding to that of FIG. 1 is identified by the same reference character. The image processing algorithm selection means 4 of FIG. 9 comprises a confidence result file 32 of the image processing algorithm selected in the preceding frame. The confidence result file 32 stores the kind of lane recognition algorithm and the lane recognition confidence in the preceding frame.

An algorithm selection means 31 refers the image processing algorithm selected in the preceding time which is stored in the confidence result file 32, and directly uses the image processing algorithm of the preceding time if the lane can be recognized in the preceding time. This is a method of using the continuity that lane markers of the same shape generally continuously appear. Hereinafter, the selection of the image processing algorithm of this type is referred to as a same algorithm continuous using method. In this method, the other algorithm is tried and used only when the lane can not be recognized in the preceding time.

Figure 10:
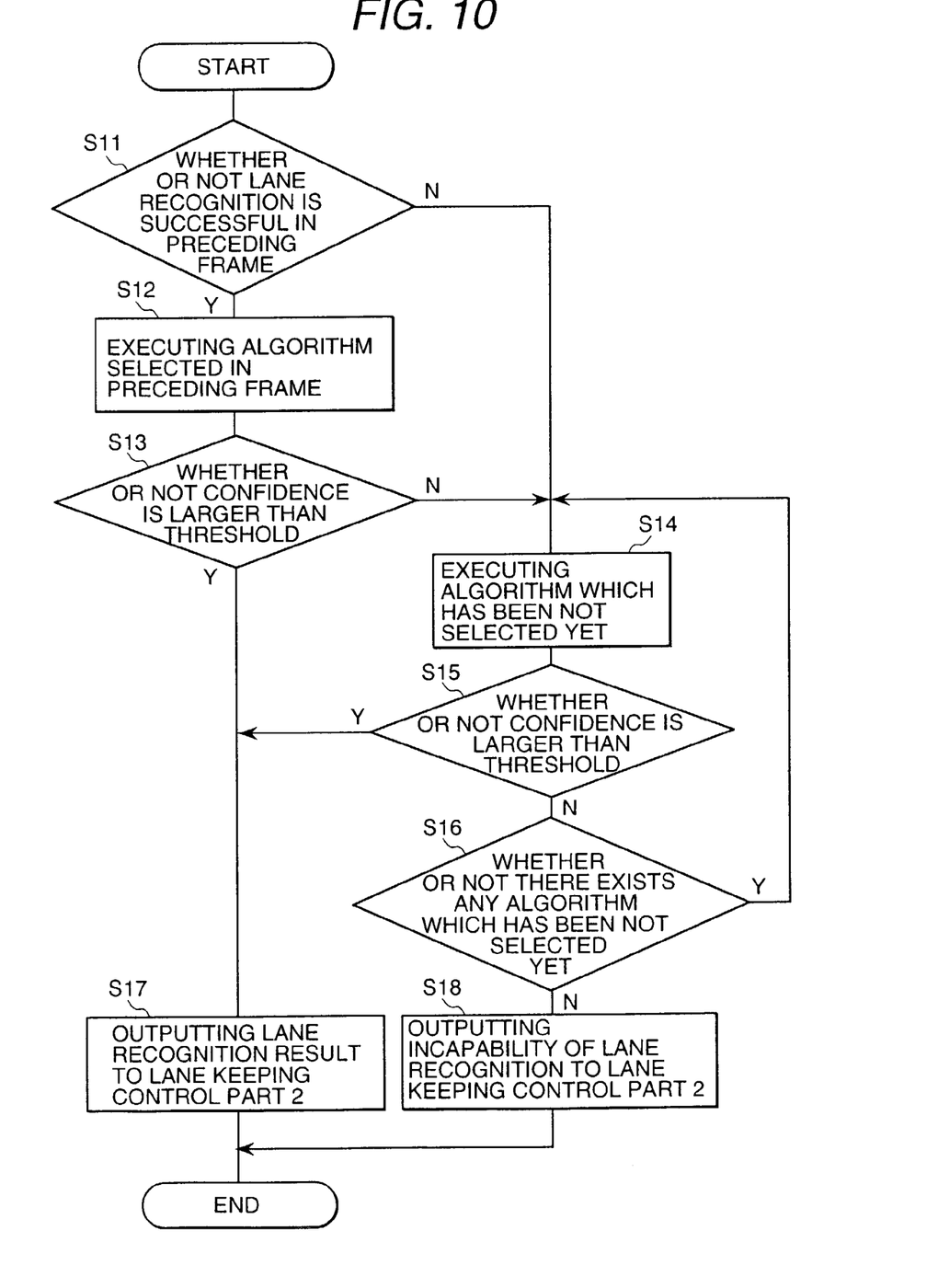
FIG. 10 is a processing flowchart explaining the operation of the embodiment of FIG. 9.

FIG. 10 shows the processing flow of the same algorithm continuous using method.

In Step S11, according to the lane recognition confidence of the image processing algorithm selected in the preceding frame, it is judged which image processing algorithm is to be used in this time. If the value of the lane recognition confidence of the image processing algorithm selected in the preceding frame is higher than a preset threshold, it is considered that the lane detection has been successful by the image processing algorithm selected in the preceding frame, and then the processing proceeds to Step S12. If not, the processing proceeds to Step S14. However, since there is no execution result of the preceding frame in the initial execution, the processing directly proceeds to Step S14 in the initial time.

In Step S12, the image processing algorithm by which it has been judged that the lane is detected in the preceding frame is directly used. The kinds of the image processing algorithms are the white line recognition algorithm, the raised pavement marker recognition algorithm, the post cone recognition algorithm and the road surface pattern recognition algorithm. The output of the processing result in Step S12 is the lane recognition result and the lane recognition confidence.

In Step S13, from the lane recognition confidence obtained by Step S12 it is judged whether or not the driving lane can be detected. If the lane recognition confidence exceeds a preset threshold, the processing proceeds to Step S17 by considering that the lane is detected. If the lane recognition confidence does not exceed the preset threshold, the processing proceeds to Step S14 by considering that the lane is not detected.

The processing of Step S14 is executed when it is judged that the lane is not detected as the result of executing the image processing algorithm or when the lane can not detected by the image processing algorithm selected in the preceding time. In this case, the image processing algorithms not executed yet are executed one by one. The output of the processing result in Step S14 is the lane recognition result and the lane recognition confidence.

In Step S15, from the lane recognition confidence obtained by Step S14 it is judged whether or not the driving lane can be detected. If the lane recognition confidence exceeds a preset threshold, the processing proceeds to Step S17 by considering that the lane is detected. If the lane recognition confidence does not exceed the preset threshold, the processing proceeds to Step S16 by considering that the lane is not detected.

Step S16 is a branch provided for try the algorithms not executed yet when the lane detection is failed. If there remain the image processing algorithms not executed yet, the processing returns to Step S14. If all the image processing algorithms have been executed, the processing proceeds to Step S18.

However, since it takes a very long time to execute all the algorithms, a trouble may occur in control of the lane keeping control part 2 during running of the vehicle at high speed. In such a case, using driving speed information of the vehicle, the recognition result can be output within an allowable processing time by limiting number of processing times at high speed driving, and the recognition accuracy can be improved by increasing number of processing times at low speed driving.

The processing of Step S17 is executed when it is judged that the lane is detected. The lane recognition result is output to the lane keeping control part 2. The processing of Step S18 is executed when it is judged that the lane is not detected. Information of incapability of lane detection is output to the lane keeping control part 2.

As described above, in the same algorithm continuous using method, since the actual lane markers of a driving route is not known, it can not always said that the image processing algorithm suitable for the lane marker shape of the driving route is executed. Therefore, although the reliability of the recognition result is lower compared to that of the road map referring method, this can be equally said to the case of totally executing the image processing algorithms.

However, the same algorithm continuous using method can perform high speed processing compared to the case of totally executing the image processing algorithms. Further, the image processing algorithm selection means 4 requires only the image processing data file 11, and does not require the GPS receiver 14 and the road map data 16. Therefore, the same algorithm continuous using method can provide a lane recognition system simpler than the structure of the road map referring method.

The driving lane is detected as described above. In the same algorithm continuous using method, the image processing means for image-processing a road image comprises the plural different kinds of image processing algorithms, and the driving lane is detected by selecting one image processing algorithm suitable for the driving lane out of the plural different kinds of image processing algorithms. Therefore, the accuracy of the lane recognition can be improved by stably detecting the plural kinds of lane markers.

In the embodiment described above, the driving lane is detected by selecting the image processing algorithm by the lane recognition system itself. However, the same effect can be obviously obtained by that the driver of the vehicle visually identifies the lane marker, and manually selects one of the image processing algorithms.

According to the present invention, the image processing means for image-processing a road image comprises the plural different kinds of image processing algorithms, and the driving lane is detected by selecting one image processing algorithm suitable for the driving lane out of the plural different kinds of image processing algorithms. Therefore, the accuracy of the lane recognition can be improved by stably detecting the plural kinds of lane markers.

What is claimed is:

1. A driving lane recognition system, which comprises:
   an imaging means for taking an image of a road in front of a vehicle, said imaging means being mounted on said vehicle;
   an image processing means for detecting the driving lane of said vehicle from the image of road taken by said imaging means, said image processing means having a plurality of different kinds of image processing algorithms individually corresponding to various kinds of lane markers of the driving lane arranged on said road; and
   an image processing algorithm selection means for identifying the lane marker kind on the road on which said vehicle is running, and for selecting one of the image processing algorithms used by said image processing means to detect the driving lane.

2. A driving lane recognition system, which comprises:
   an imaging means for taking an image of a road in front of a vehicle, said imaging means being mounted on said vehicle;
   an image processing means for detecting the driving lane of said vehicle from the image of road taken by said imaging means, said image processing means having a plurality of different kinds of image processing algorithms individually corresponding to various kinds of lane markers of the driving lane arranged on said road; and an image processing algorithm selection means for identifying the lane marker kind on the road on which said vehicle is running, and for selecting one of the image processing algorithms used for detecting the driving lane using the said image processing means, wherein said image processing means comprises a road surface pattern recognition algorithm for executing road pattern recognition processing of said road when the driving lane can not be detected by said plurality of image processing algorithms.

3. A driving lane recognition system, which comprises:

an imaging means for taking an image of a road in front of a vehicle, said imaging means being mounted on said vehicle;

an image processing means for detecting the driving lane of said vehicle from the image of road taken by said imaging means, said image processing means having a plurality of different kinds of image processing algorithms individually corresponding to various kinds of lane markers of the driving lane arranged on said road;

an image processing algorithm selection means for identifying the lane marker kind on the road on which said vehicle is running, and for selecting one of the image processing algorithms used for detecting the driving lane using the said image processing means;

a position detection means for detecting a position of road on which said vehicle is running;

a road map data file for storing said lane marker kinds individually for said roads; and a lane marker kind identification means for capturing and identifying the lane marker kind on the road on which said vehicle is running based on positional information of said position detection means, and for selecting the image processing algorithm used by said image processing means to detect the driving lane.

4. A driving lane recognition system, which comprises:

a camera for taking an image of a road in front of a vehicle, said camera being mounted on said vehicle;

an image processing means for detecting the driving lane of said vehicle from the image of road taken by said camera, said image processing means having a plurality of different kinds of image processing algorithms individually corresponding to various kinds of lane markers of the driving lane arranged in said road;

a GPS receiving means for receiving positional information of the road on which said vehicle is running from a satellite;

a road map data file for storing said lane marker kinds individually for said roads; and a lane marker kind identification means for capturing and identifying the lane marker kind on the road on which said vehicle is running based on positional information of said GPS receiving means, and for selecting one of the image processing algorithms used by said image processing means to detect the driving lane.

5. A driving lane recognition system, which comprises:

a camera for taking an image of a road in front of a vehicle, said camera being mounted on said vehicle;

an image processing means for detecting the driving lane of said vehicle from the image of road taken by said camera, said image processing means having a plurality of different kinds of image processing algorithms individually corresponding to various kinds of lane markers of the driving lane arranged in said road;

a beacon receiving means for receiving lane marker shape information of the road on which said vehicle is running from a road-to-vehicle communication system; and a lane marker kind identification means for capturing and identifying the lane marker kind on the road on which said vehicle is running based on said lane marker shape information received by said beacon receiving means, and for selecting one of the image processing algorithms used by said image processing means to detect the driving lane.

6. A driving lane recognition system, which comprises:

a camera for taking an image of a road in front of a vehicle, said camera being mounted on said vehicle;

an image processing means for detecting the driving lane of said vehicle from the image of road taken by said camera, said image processing means having a plurality of different kinds of image processing algorithms individually corresponding to various kinds of lane markers of white line, raised pavement marker and post cone arranged on said road;

a position detection means for detecting a position of road on which said vehicle is running;

a road map data file for storing said lane marker kinds of the white line, the raised pavement marker and the post cone individually for said roads; and a lane marker kind identification means for capturing and identifying the lane marker kind on the road on which said vehicle is running based on positional information of said position detection means, and for selecting one of the image processing algorithms used by said image processing means to detect the driving lane.

7. A driving lane recognition system, which comprises:

a camera for taking an image of a road in front of a vehicle, said camera being mounted on said vehicle;

an image processing means for detecting the driving lane of said vehicle from the image of road taken by said camera, said image processing means having a plurality of different kinds of image processing algorithms individually corresponding to various kinds of lane markers of white line, raised pavement marker and post cone arranged on said road;

a position detection means for detecting a position of road on which said vehicle is running;

a road map data file for storing said lane marker kinds of the white line, the raised pavement marker and the post cone individually for said roads; and a lane marker kind identification means for capturing and identifying the lane marker kind on the road on which said vehicle is running based on positional information of said position detection means, and for selecting one of the image processing algorithms used by said image processing means to detect the driving lane, wherein said image processing algorithm of said image processing means includes detection of the lane based on edge information of lane marker, detection of the lane based on pattern matching using a pattern shape of lane marker and detection of the lane based on density projection information of a road surface.

8. A driving lane recognition system, which comprises:

a camera for taking an image of a road in front of a vehicle, said camera being mounted on said vehicle;

an image processing means for detecting the driving lane of said vehicle from the image of road taken by said camera, said image processing means having a plurality of different kinds of image processing algorithms individually corresponding to various kinds of lane markers of the driving lane arranged in said road;

an image processing selection means which selects one of the image processing algorithms employed for detecting the driving lane of the vehicle in this time based on a recognition confidence by an image processing algorithm employed for detecting the driving lane of the vehicle in the precedent time by said image processing means.

9. A driving lane recognition system according to claim 8, wherein said image processing algorithm selection means comprises an algorithm recognition confidence result file for storing a history on kinds and confidences of the image processing algorithms selected in the past, and selects one of said image processing algorithms based on said history.

* * * * *